United States Patent
Griffin

(10) Patent No.: US 11,649,770 B1
(45) Date of Patent: May 16, 2023

(54) BLEED HOLE FLOW DISCOURAGER

(71) Applicant: Raytheon Technologies Corporation, Farmington, CT (US)

(72) Inventor: David R. Griffin, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/876,034

(22) Filed: Jul. 28, 2022

(51) Int. Cl.
*F02C 9/18* (2006.01)
*F02C 3/04* (2006.01)

(52) U.S. Cl.
CPC . *F02C 9/18* (2013.01); *F02C 3/04* (2013.01)

(58) Field of Classification Search
CPC ..................................... F02C 9/18; F02C 3/04
See application file for complete search history.

(56) References Cited

U.S. PATENT DOCUMENTS

| | | | | |
|---|---|---|---|---|
| 3,945,759 A * | 3/1976 | Bobo | ................... | F04D 29/545 415/145 |
| 3,976,394 A * | 8/1976 | Tarter | ................. | F04D 27/0215 415/144 |
| 4,101,242 A * | 7/1978 | Coplin | ................... | F01D 11/18 415/199.5 |
| 6,732,530 B2 * | 5/2004 | Laurello | ............... | F04D 29/584 60/785 |
| 7,600,965 B2 | 10/2009 | Seitz | | |
| 10,934,943 B2 | 3/2021 | Taylor et al. | | |
| 2015/0361890 A1 * | 12/2015 | Suciu | ........................ | F02C 9/18 60/785 |

FOREIGN PATENT DOCUMENTS

EP  3486498 A1  5/2019

* cited by examiner

*Primary Examiner* — Jesse S Bogue
(74) *Attorney, Agent, or Firm* — Carlson, Gaskey & Olds, P.C.

(57) ABSTRACT

A gas turbine engine includes a compressor section, a turbine section and an intermediate combustor. The compressor section has a plurality of rotating compressor blades rotating about an axis of rotation, and static stator vanes positioned axially intermediate the rotating compressor blades. There are a plurality of bleed holes extending through a compressor outer housing positioned radially outwardly of the rotating compressor blades, and allowing air compressed by the compressor blades to move into a bleed chamber. There is a bleed chamber outer housing positioned radially outwardly of the compressor outer housing, and defining the bleed chamber in part in combination with the compressor outer housing. A flow discourager is positioned radially intermediate the bleed holes and the bleed outer housing, such that air leaving the bleed hole impacts upon the flow discourager before reaching the bleed chamber outer housing.

18 Claims, 2 Drawing Sheets

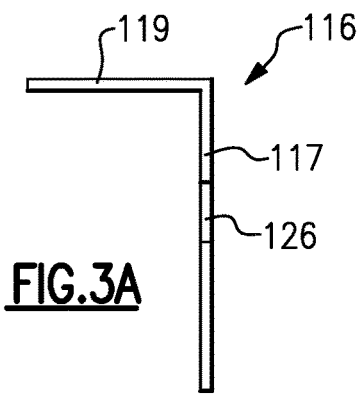
FIG.3A
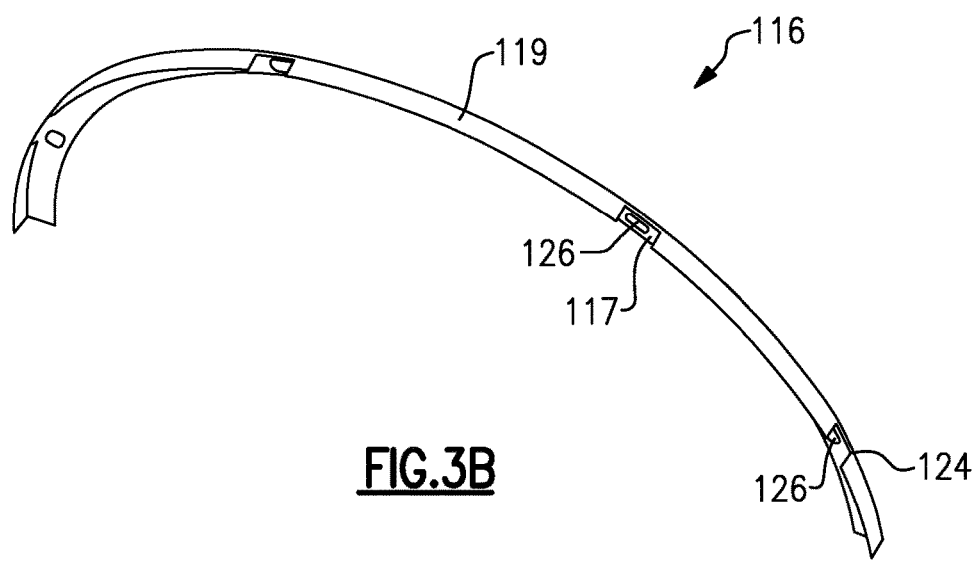
FIG.3B
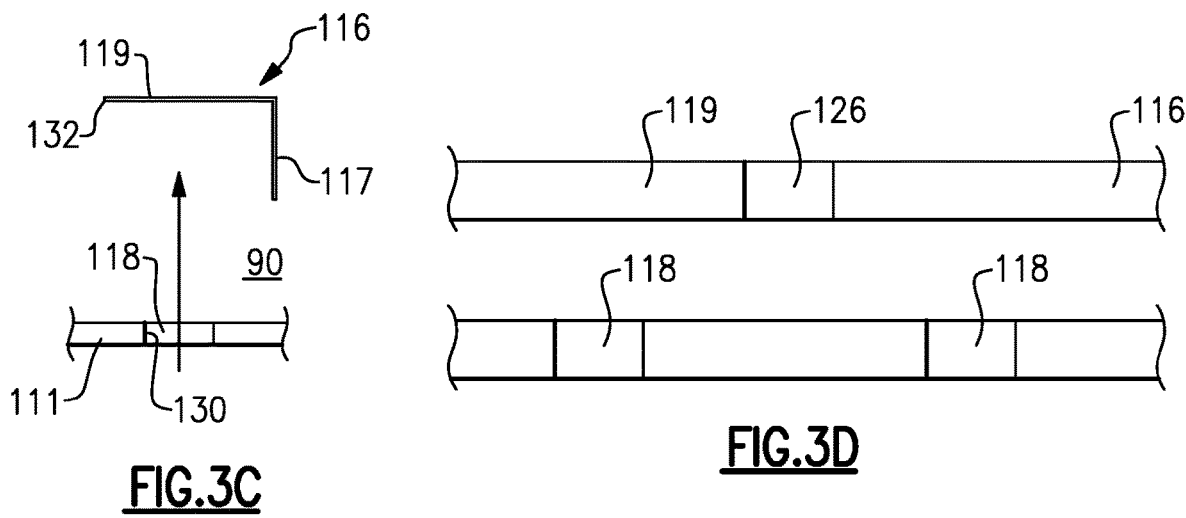
FIG.3C
FIG.3D

BLEED HOLE FLOW DISCOURAGER

BACKGROUND OF THE INVENTION

This application relates to a flow discourager associated with a housing chamber receiving bleed air from a gas turbine engine compressor section.

Gas turbine engines are known, and typically include a fan delivering air into a bypass duct as propulsion air. The fan also delivers air to a compressor section. Air compressed by the compressor is delivered into a combustor where it is mixed with fuel and ignited. Products of this combustion pass downstream over turbine rotors, driving them to rotate.

As known, gas turbine engines have several sections that become quite hot during operation. As examples, the air compressed by the compressor will reach high temperatures. The turbine section will see very high temperatures downstream of the combustor. It is known to bleed compressor air and then utilize that bleed air to cool components in the compressor and/or turbine section.

In a known system, the air bled from the compressor section moves into a bleed chamber, and extends directly across the bleed chamber to an outer housing, where it impacts the outer housing. This provides heat stress on the outer housing.

SUMMARY OF THE INVENTION

In a featured embodiment, a gas turbine engine includes a compressor section, a turbine section and an intermediate combustor. The compressor section has a plurality of rotating compressor blades rotating about an axis of rotation, and static stator vanes positioned axially intermediate the rotating compressor blades. There are a plurality of bleed holes extending through a compressor outer housing positioned radially outwardly of the rotating compressor blades, and allowing air compressed by the compressor blades to move into a bleed chamber. There is a bleed chamber outer housing positioned radially outwardly of the compressor outer housing, and defining the bleed chamber in part in combination with the compressor outer housing. A flow discourager is positioned radially intermediate the bleed holes and the bleed outer housing, such that air leaving the bleed hole impacts upon the flow discourager before reaching the bleed chamber outer housing.

In another embodiment according to the previous embodiment, the flow discourager has a mount portion which is connected to a mount housing, and a blocking portion extending from the mount portion at an angle that is within 20 degrees of being parallel to the axis of rotation of the compressor blades.

In another embodiment according to any of the previous embodiments, the blocking portion extends at an angle that is within 10 degrees of being parallel to the axis of rotation.

In another embodiment according to any of the previous embodiments, the blocking portion extends at a right angle from the mount portion.

In another embodiment according to any of the previous embodiments, the flow discourager is bolted to the mount housing.

In another embodiment according to any of the previous embodiments, the blocking portion extends axially forwardly of the mount portion to a blocking portion axially forwardmost extent. The bleed holes have a bleed hole axially forwardmost extent. The bleed hole axially forwardmost extent is axially rearward of the blocking portion axially forwardmost extent.

In another embodiment according to any of the previous embodiments, air from the bleed chamber is directed to cool components in a turbine section.

In another embodiment according to any of the previous embodiments, an intermediate heat exchanger cools the air from the bleed chamber before it reaches the turbine section.

In another embodiment according to any of the previous embodiments, there are a plurality of circumferentially spaced bleed holes, and a plurality of bolt holes in the mount portion.

In another embodiment according to any of the previous embodiments, the bolt holes are formed to be circumferentially offset and intermediate adjacent ones of the bleed holes.

In another embodiment according to any of the previous embodiments, the blocking portion has wrench slots which are open, and are associated with each of the bolt holes to facilitate tightening of a bolt in the bolt hole.

In another embodiment according to any of the previous embodiments, there is a downstream most compressor blade that defines a highest pressure point in the compressor section and lesser pressure points upstream of the highest pressure point. The bleed holes are downstream of a compressor blade which is at a lesser pressure point of the compressor section.

In another embodiment according to any of the previous embodiments, the blocking portion extends axially forwardly of the mount portion to a blocking portion axially forwardmost extent. The bleed holes have a bleed hole axially forwardmost extent. The bleed hole axially forwardmost extent is axially rearward of the blocking portion axially forwardmost extent.

In another embodiment according to any of the previous embodiments, there are a plurality of circumferentially spaced bleed holes, and a plurality of fastener holes in the mount portion.

In another embodiment according to any of the previous embodiments, the fastener holes are formed to be circumferentially offset and intermediate adjacent ones of the bleed holes.

In another embodiment according to any of the previous embodiments, the blocking portion has wrench slots which are open, and are associated with each of the bolt holes to facilitate tightening of a bolt in the bolt hole.

In another embodiment according to any of the previous embodiments, there is a downstream most compressor blade that defines a highest pressure point in the compressor section and lesser pressure points upstream of the highest pressure point. The bleed holes are downstream of a compressor blade which is at a lesser pressure point of the compressor section.

In another embodiment according to any of the previous embodiments, air from the bleed chamber is directed to cool components in a turbine section.

In another embodiment according to any of the previous embodiments, an intermediate heat exchanger cools the air from the bleed chamber before it reaches the turbine section.

In another embodiment according to any of the previous embodiments, there is a downstream most compressor blade that defines a highest pressure point in the compressor section and lesser pressure points upstream of the highest pressure point. The bleed holes are downstream of a compressor blade which is at a lesser pressure point of the compressor section.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 3A shows a flow discourager.
FIG. 3B shows another feature of the flow discourager.
FIG. 3C shows yet another feature.
FIG. 3D shows another feature.

DETAILED DESCRIPTION

Figure 1:
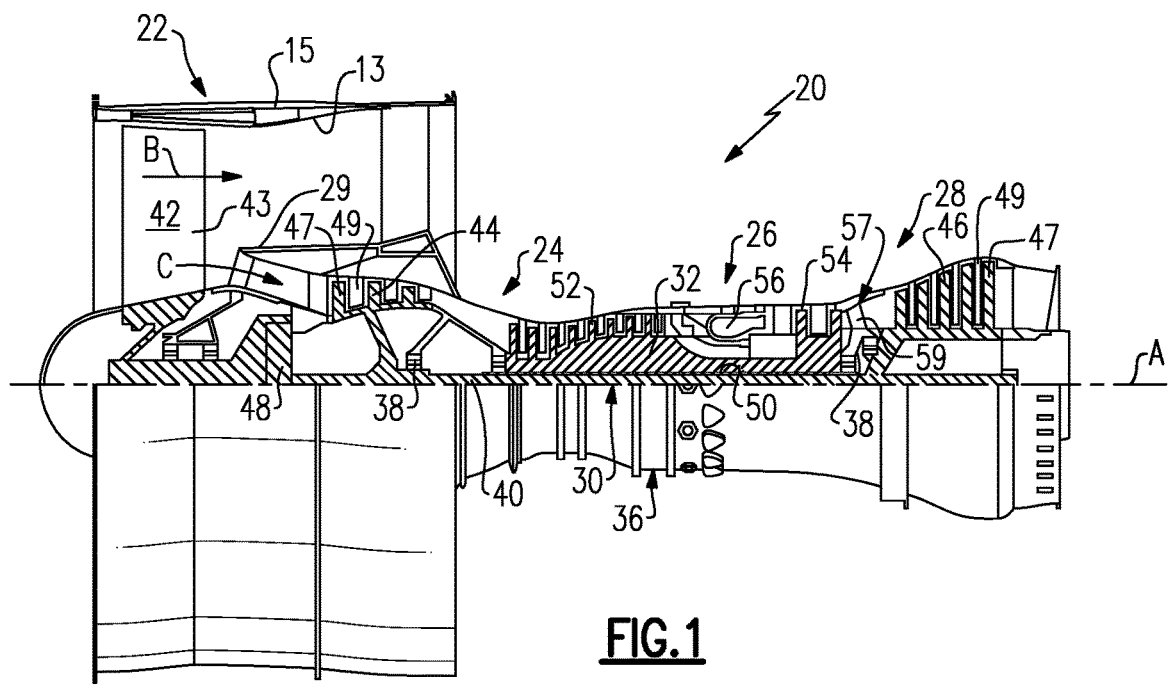
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7\ °R)]^{0.5}$. The corrected fan tip speed can be less than or equal to 1150.0 ft/second (350.5 meters/second), and can be greater than or equal to 1000.0 ft/second (304.8 meters/second).

Figure 2:
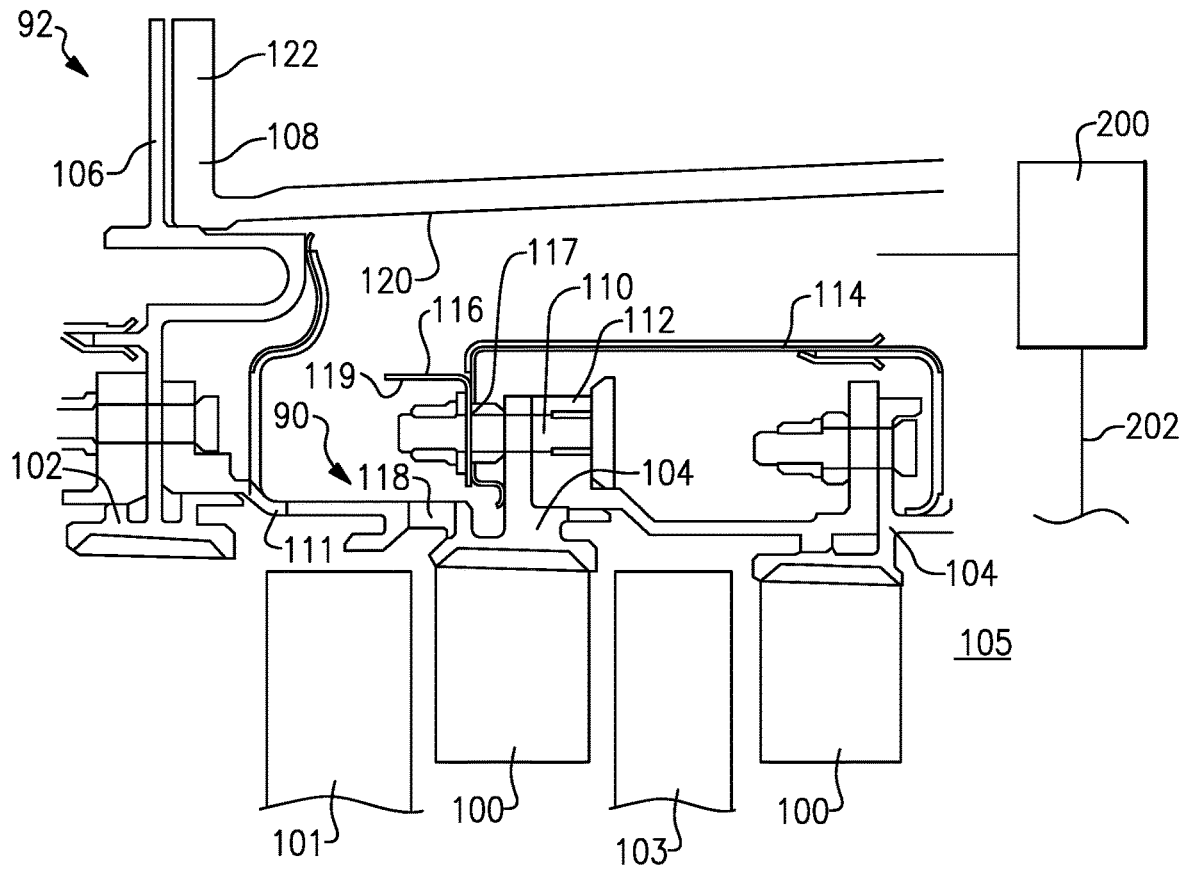
FIG. 2 shows a portion of a compressor section associated with a gas turbine engine such as the FIG. 1 engine.

FIG. 2 shows a compressor section 92 rotating compressor blades 101 and 103. Blade 103 may be a downstream most compressor blade in the compressor section. Thus, it could be said that blade 101 is at a location which is upstream of the highest compression point 105 in the compressor section 92.

Housing members 104 are associated with stators 100, with one intermediate blades 101 and 103 and one downstream of the blade 103. A housing member 106 is associated with the seal mount 102. Housing 106 is connected to an outer housing 108 which defines a bleed chamber 90 in combination with the housing 106 and an inner housing 111 which defines an outer wall to the compressor section 92.

Bolts 110 connect a housing member 112 to the stator mounts 104. An outer housing 114 is positioned outwardly of the housing member 112.

A bleed hole 118 allows air from a location which is upstream of the most downstream point 105 in the compressor section 92 to move into the bleed chamber 90. As can be seen, bleed chamber 90 is much larger than bleed hole 118. That air will be at high temperature and pressure. In the prior art the air moved across the bleed chamber 90 generally directly radially outwardly and against a wall portion 120 of the housing 108. Thus, the portion 120 which is impacted by the air from the bleed hole 118 would increase in temperature, and there are thermal stresses between it and another housing location 122 which is spaced radially outwardly.

To address this thermal stress, a flow discourager 116 is positioned in the path of the bleed air flow. The flow discourager 116 is generally L-shaped. That is, there is a mount section 117 which receives the bolt 110 to secure the flow discourager 116 to the housings 104 and 112. A blocking portion 119 extends from the mount portion 117 such that the blocking portion is within 20 degrees of being parallel to the axis of rotation of the compressor section 92. In embodiments, the blocking portion 119 is within 10 degrees of being parallel. In one embodiment, the blocking section is at a right angle relative to the mount portion 117, and thus the flow discourager 116 could be said to be L-shaped.

Now, when air leaves the bleed port 118 it impacts on blocking section 119. The air then swirls outwardly around the blocking section 119 such that it does not directly impact the wall portion 120.

Air downstream of the chamber 90 reaches an optional heat exchanger 200, and then is delivered at 202 to a use such as cooling components in a turbine section.

FIG. 3A shows details of the flow discourager 116. The mount section 117 is illustrated at a right angle relative to the blocking section 119. A bolt hole 126 extends through the mount portion 117.

FIG. 3B shows that the flow discourager 116 extends generally circumferentially. In embodiments, the flow discourager 116 will extend over 360 degrees relative to the rotational axis of the gas turbine engine. In one embodiment, there are circumferential two sub-portions to the flow discourager 116. As shown in FIG. 3B, associated with each bolt hole 126 is an open slot 124 in the blocking portion 119. This allows wrench access to a bolt 110 received in a bolt hole 126.

As shown in FIG. 3C, the flow discourager 116 has the blocking portion 119 having an axially forwardmost end 132 received in the chamber 90, and which is axially forward of an axially forwardmost point 130 of the bleed hole 118. Thus, the vast majority of the air leaving the bleed hole 118 will impact upon the blocking portion 119.

FIG. 3D shows another feature. There are a plurality of bleed holes 118 spaced circumferentially. In one embodiment there are eight bleed holes. The bolt holes 126, and hence the slots 124, are circumferentially intermediate adjacent ones of the bleed holes 118. Thus, little or no air leaving the bleed holes 118 will impact directly through the slot 124.

The proposed flow discourager has been shown to provide great improvement in reducing the thermal load at the wall portion 120.

The flow discourager may be formed of a sheet metal.

A gas turbine engine under this disclosure could be said to include a compressor section, a turbine section and an intermediate combustor. The compressor section has a plurality of rotating compressor blades rotating about an axis of rotation, and static stator vanes positioned axially intermediate the rotating compressor blades. There are a plurality of bleed holes extending through a compressor outer housing positioned radially outwardly of the rotating compressor blades, and allowing air compressed by the compressor blades to move into a bleed chamber. There is a bleed chamber outer housing positioned radially outwardly of the compressor outer housing, and defining the bleed chamber in part in combination with the compressor outer housing. A flow discourager is positioned radially intermediate the bleed holes and the bleed outer housing, such that air leaving the bleed hole impacts upon the flow discourager before reaching the bleed chamber outer housing.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
a compressor section, a turbine section and an intermediate combustor;

said compressor section having a plurality of rotating compressor blades rotating about an axis of rotation, and static stator vanes positioned axially intermediate the rotating compressor blades;

there being a plurality of bleed holes extending through a compressor outer housing positioned radially outwardly of said rotating compressor blades, and allowing air compressed by said compressor blades to move into a bleed chamber;

there being a bleed chamber outer housing positioned radially outwardly of said compressor outer housing, and defining said bleed chamber in part in combination with said compressor outer housing; and a flow discourager positioned radially intermediate said bleed holes and said bleed outer housing, such that air leaving said bleed hole impacts upon said flow discourager before reaching said bleed chamber outer housing;

wherein said flow discourager has a mount portion which is connected to a mount housing, and a blocking portion extending from said mount portion at an angle that is within 20 degrees of being parallel to the axis of rotation of the compressor blades;

wherein there are a plurality of circumferentially spaced bleed holes, and a plurality of fastener holes in said mount portion; and wherein said fastener holes are formed to be circumferentially offset and intermediate adjacent ones of said bleed holes.

2. The gas turbine engine as set forth in claim 1, wherein there being a downstream most compressor blade that defines a highest pressure point in the compressor section and lesser pressure points upstream of said highest pressure point, and said bleed holes being downstream of a compressor blade which is at a lesser pressure point of the compressor section.

3. The gas turbine engine as set forth in claim 1, wherein said blocking portion extends at an angle that is within 10 degrees of being parallel to the axis of rotation.

4. The gas turbine engine as set forth in claim 3, wherein said blocking portion extends at a right angle from said mount portion.

5. The gas turbine engine as set forth in claim 3, wherein said flow discourager is bolted to the mount housing.

6. The gas turbine engine as set forth in claim 1, wherein said blocking portion extending axially forwardly of said mount portion to a blocking portion axially forwardmost extent, said bleed holes having a bleed hole axially forwardmost extent, said bleed hole axially forwardmost extent being axially rearward of said blocking portion axially forwardmost extent.

7. The gas turbine engine as set forth in claim 1, wherein said blocking portion having wrench slots which are open, and associated with each of said bolt holes to facilitate tightening of a bolt in said bolt hole.

8. The gas turbine engine as set forth in claim 7, wherein there being a downstream most compressor blade that defines a highest pressure point in the compressor section and lesser pressure points upstream of said highest pressure point, and said bleed holes being downstream of a compressor blade which is at a lesser pressure point of the compressor section.

9. The gas turbine engine as set forth in claim 1, wherein air from said bleed chamber being directed to cool components in a turbine section.

10. The gas turbine engine as set forth in claim 9, wherein an intermediate heat exchanger cools the air from the bleed chamber before it reaches said turbine section.

11. A gas turbine engine comprising:
a compressor section, a turbine section and an intermediate combustor;

said compressor section having a plurality of rotating compressor blades rotating about an axis of rotation, and static stator vanes positioned axially intermediate the rotating compressor blades;

there being a plurality of bleed holes extending through a compressor outer housing positioned radially outwardly of said rotating compressor blades, and allowing air compressed by said compressor blades to move into a bleed chamber;

there being a bleed chamber outer housing positioned radially outwardly of said compressor outer housing, and defining said bleed chamber in part in combination with said compressor outer housing; and a flow discourager positioned radially intermediate said bleed holes and said bleed outer housing, such that air leaving said bleed hole impacts upon said flow discourager before reaching said bleed chamber outer housing;

wherein said flow discourager has a mount portion which is connected to a mount housing, and a blocking portion extending from said mount portion at an angle that is within 20 degrees of being parallel to the axis of rotation of the compressor blades;

wherein said flow discourager is bolted to the mount housing; and wherein said blocking portion extending axially forwardly of said mount portion to a blocking portion axially forwardmost extent, said bleed holes having a bleed hole axially forwardmost extent, said bleed hole axially forwardmost extent being axially rearward of said blocking portion axially forwardmost extent.

12. The gas turbine engine as set forth in claim 11, wherein air from said bleed chamber being directed to cool components in a turbine section.

13. The gas turbine engine as set forth in claim 12, wherein an intermediate heat exchanger cools the air from the bleed chamber before it reaches said turbine section.

14. The gas turbine engine as set forth in claim 11, wherein said blocking portion extends at an angle that is within 10 degrees of being parallel to the axis of rotation.

15. A gas turbine engine comprising:
a compressor section, a turbine section and an intermediate combustor;

said compressor section having a plurality of rotating compressor blades rotating about an axis of rotation, and static stator vanes positioned axially intermediate the rotating compressor blades;

there being a plurality of bleed holes extending through a compressor outer housing positioned radially outwardly of said rotating compressor blades, and allowing air compressed by said compressor blades to move into a bleed chamber;

there being a bleed chamber outer housing positioned radially outwardly of said compressor outer housing, and defining said bleed chamber in part in combination with said compressor outer housing; and a flow discourager positioned radially intermediate said bleed holes and said bleed outer housing, such that air leaving said bleed hole impacts upon said flow discourager before reaching said bleed chamber outer housing;

wherein said flow discourager has a mount portion which is connected to a mount housing, and a blocking portion extending from said mount portion at an angle that is within 20 degrees of being parallel to the axis of rotation of the compressor blades;

wherein said flow discourager is bolted to the mount housing;

wherein there are a plurality of circumferentially spaced bleed holes, and a plurality of bolt holes in said mount portion; and wherein said bolt holes are formed to be circumferentially offset and intermediate adjacent ones of said bleed holes.

16. The gas turbine engine as set forth in claim 15, wherein said blocking portion having wrench slots which are open, and associated with each of said bolt holes to facilitate tightening of a bolt in said bolt hole.

17. The gas turbine engine as set forth in claim 16, wherein there being a downstream most compressor blade that defines a highest pressure point in the compressor section and lesser pressure points upstream of said highest pressure point, and said bleed holes being downstream of a compressor blade which is at a lesser pressure point of the compressor section.

18. The gas turbine engine as set forth in claim 15, wherein said blocking portion extends at an angle that is within 10 degrees of being parallel to the axis of rotation.

\* \* \* \* \*